(12) United States Patent
Schaffer

(10) Patent No.: US 6,340,077 B1
(45) Date of Patent: Jan. 22, 2002

(54) ELECTROMECHANICAL WHEEL BRAKE SYSTEM

(75) Inventor: Wolfram Schaffer, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/554,453
(22) PCT Filed: Jul. 16, 1998
(86) PCT No.: PCT/DE98/01989
§ 371 Date: Aug. 25, 2000
§ 102(e) Date: Aug. 25, 2000
(87) PCT Pub. No.: WO99/25987
PCT Pub. Date: May 27, 1999

(30) Foreign Application Priority Data

Nov. 13, 1997 (DE) .......................................... 197 50 272
May 27, 1998 (DE) .......................................... 198 23 568

(51) Int. Cl.$^7$ ............................................. F16D 65/36
(52) U.S. Cl. ....................................... 188/156; 188/71.7
(58) Field of Search ................................. 188/71.7, 71.8, 188/72.3, 72.7, 72.8, 156, 157, 161, 162, 196; 192/90

(56) References Cited

U.S. PATENT DOCUMENTS

| 4,397,380 A | * | 8/1983 | Yew ........................... 192/84 C |
| 4,399,894 A | * | 8/1983 | Tribe ........................... 188/71.9 |
| 4,445,596 A | * | 5/1984 | Waters et al. ................. 188/171 |
| 4,531,419 A | * | 7/1985 | Botz et al. ............... 74/388 PS |
| 4,802,558 A | * | 2/1989 | Garnett .......................... 188/134 |
| 4,809,824 A | * | 3/1989 | Fargier et al. .............. 188/72.8 |
| 5,107,967 A | * | 4/1992 | Fujita et al. ................. 188/72.1 |
| 5,620,077 A | * | 4/1997 | Richard ........................ 192/120 |
| 5,829,557 A | * | 11/1998 | Halasy-Wimmer et al. . 188/162 |
| 6,213,256 B1 | * | 4/2001 | Schaffer ...................... 188/71.9 |

* cited by examiner

Primary Examiner—Robert J. Oberleitner
Assistant Examiner—Xuan Lan Nguyen
(74) Attorney, Agent, or Firm—Ronald E. Greigg

(57) ABSTRACT

The invention relates to an electromechanical wheel brake device, having a screw link actuator, which is supported in a floating caliper. The screw link actuator can be driven by an electric motor, and can press a frictional brake lining against one side of a brake disc and can press a second frictional brake lining against another side of the brake disc by means of a reaction force by way of the floating caliper. In order to permit a release of the wheel brake device in the event of a malfunction, brake device embodies the screw link actuator as selflocking-free, supporting a spindle nut and a threaded spindle in rotary fashion, and securing the threaded spindle against rotation by means of a releasable rotation prevention device. The threaded spindle is connected in a rotationally secured and axially mobile fashion by means of a positive engagement. In the event of a malfunction, the rotation prevention device is released and the frictional brake lining, which is pressed with force against the brake disc, presses the threaded spindle away from the brake disc, wherein the threaded spindle is set into rotation and moves away from the brake disc.

12 Claims, 2 Drawing Sheets

ELECTROMECHANICAL WHEEL BRAKE SYSTEM

PRIOR ART

The invention relates to an electromechanical wheel brake device for a motor vehicle.

An electromechanical wheel brake device that defines a similar system has been disclosed by EP-A-0 275 783. The prior art wheel brake device has an axially immobile threaded spindle which can be connected to a first gear by means of a switchable electromagnetic clutch. A rotatable and axially mobile spindle nut on the threaded spindle supports a second gear, which can be coupled to the spindle nut in a manner that depends on the axial force. The two gears, together with a third gear that can be driven by an electric motor 30 and engages the two other gears, constitute a differential drive. The spindle nut supports a longitudinally mobile piston for pressing a frictional brake lining against a brake body.

In a braking maneuver, the electric motor and the electromagnetic clutch are supplied with current. The rotary driven threaded spindle moves the spindle nut, which is not driven at first, in order to rapidly overcome the air play between the frictional brake lining and the brake body. With the buildup of an axial force that couples gear to the spindle nut due to the engagement of the frictional brake lining with the brake body, the spindle nut is also driven to rotate and the differential drive is activated. The buildup of brake force acting on the brake body is now produced with considerably reduced advancing speed of the spindle nut.

In order to release the wheel brake device, the electromagnetic clutch is switched off whereas the electric motor is supplied with current. The threaded spindle, which is embodied as selflocking-free and without an electromotive drive, is now driven in the opposite rotation direction by the reaction force of the wheel brake device, which results in an axial restoring of the spindle nut, which continues to be electromotively driven at first. Once the air play is adjusted, the spindle nut is also not driven and the electric motor is switched off.

The known wheel brake device is relatively costly in terms of its construction, is friction-encumbered to a considerable degree in its linkage, and requires a frequent switching of the electromagnetic clutch during normal operation. The restoring of the wheel brake device and the adjusting of the air play takes place in a largely uncontrolled manner.

In an electromechanical wheel brake device known from the Japanese abstract 06 327190 A, a threaded spindle is provided, which can both rotate and move axially, with which a frictional brake lining can be electromotively pressed against a brake body and released from the brake body. In addition, the known wheel brake device has a rotation direction independent clutch (free engine clutch) which holds the threaded spindle so that the spindle cannot rotate during the brake actuation. Only if the brake force is neutralized when the brake is electromotively released does the free engine clutch release the threaded spindle for the automatic, uncontrolled adjustment of an air play. The publication does not give any indication as to how the wheel brake device should be released in the event that there is a failure of the electric motor, nor does it disclose the manner in which the free engine clutch is actuated.

An electromechanical wheel brake device has also been disclosed by WO 96/03301. This wheel brake device is embodied as a disc brake. The wheel brake device has a brake caliper embodied as a floating caliper, which has two wheel brake linings disposed in the floating caliper on both sides of a brake body in the form of a brake disc which can be set into rotation between the brake linings. In order to press one of the two frictional brake linings against the one side of the brake disc, the known wheel brake device has a screw link actuator whose threaded nut can be driven to rotate by an electric motor and whose threaded spindle can be pressed against the one frictional brake lining. The other frictional brake lining is pressed against the other side of the brake disc in an intrinsically known manner by means of reaction forces which occur when the one frictional brake lining is applied and which are transmitted to the other frictional brake lining by the floating caliper.

In order to restore the known wheel brake device in the event of a malfunction, i.e. in the event of the failure of the control electronics or in the event of a failure of the electric motor its power supply, the known wheel brake device has a restoring spring in the form of a spiral spring which is supported with its one end against the brake caliper and which engages the threaded spindle with its other end. When the wheel brake device is actuated, this spiral spring is stretched and wheel brake device except for an acceptable residual brake force is assured in the event of a malfunction.

In order to actuate the wheel brake device, according to the invention the wheel brake device has a releasable rotation prevention device which prevents a rotation of the threaded spindle and permits a translatory movement of the threaded spindle in the axial direction through the rotating drive of the spindle nut. The wheel brake device is released by means of driving the spindle nut to rotate in the opposite direction so that an air play between the frictional brake lining and the brake body can be electromotively adjusted. A release of the rotation prevention device of the threaded spindle is only provided in event of a malfunction. The threaded spindle is connected to the detachable rotation prevention device in a rotationally secured and axially mobile manner, preferably by means of a positively engaging connection, i.e. the threaded spindle moves in the axial direction when the frictional brake lining is applied and released, whereas the rotation prevention device remains at rest, i.e. the rotation prevention device does not follow along with the shifting motion of the threaded spindle.

The wheel brake device according to the invention has the advantage that the rotation prevention device, which permits a release of the wheel brake device without the electric motor in the event of a malfunction, does not influence the efficiency and the function of the wheel brake device. Another advantage is that the electric motor can continuously adjust the air play between the frictional brake lining and the brake body to the same value independent of a wear on the frictional brake lining so that the application path and application time do not increase.

Since the rotation prevention device of the wheel brake device according to the invention does not move along with the threaded spindle, no free space has to be provided for a movement of the rotation prevention device during the actuation efficiency and the function of the wheel brake device. Another advantage is that the electric motor can continuously adjust the air play between the frictional brake lining and the brake body to the same value independent of a wear on the frictional brake lining so that the application path and application time do not increase.

Since the rotation prevention device of the wheel brake device according to the invention does not move along with the threaded spindle, no free space has to be provided for a movement of the rotation prevention device during the actuation of the wheel brake device. This saves a considerable amount of space since with a rotation prevention device that is moved along with the threaded spindle, a free space that corresponds to the thickness of the two wheel brake linings plus the air play would have to be provided for the rotation prevention device. A brake caliper of the wheel brake device according to the invention can in this manner be embodied as approx. 20 to 30 mm shorter in the axial direction, which has a considerable advantage since the wheel brake device usually has to be accommodated with extremely limited space on the inside of a rim of a vehicle wheel. Another advantage of the rotation prevention device that does not move along with the threaded spindle is a reduced friction in the actuation and releasing of the wheel brake device according to the invention, which leads to improved dynamics in the actuation and release of the wheel brake device. Particularly in the event of a malfunction, the wheel brake device according to the invention releases in an extremely short time. Another advantage of the reduced friction in the releasing of the wheel brake device according to the invention is that the residual brake force is virtually nil. Moreover, the risk of a tilting or jamming, for example due to contamination, is slight with the rotation prevention device that does not move along with the threaded spindle.

Advantageous embodiments and improvements of the wheel brake device disclosed are set forth hereinafter.

BRIEF DESCRIPTION OF THE DRAWINGS

The invention will be explained in detail below in conjunction with an exemplary embodiment shown in the drawings.

DESCRIPTION OF THE EXEMPLARY EMBODIMENT

Figure 1:
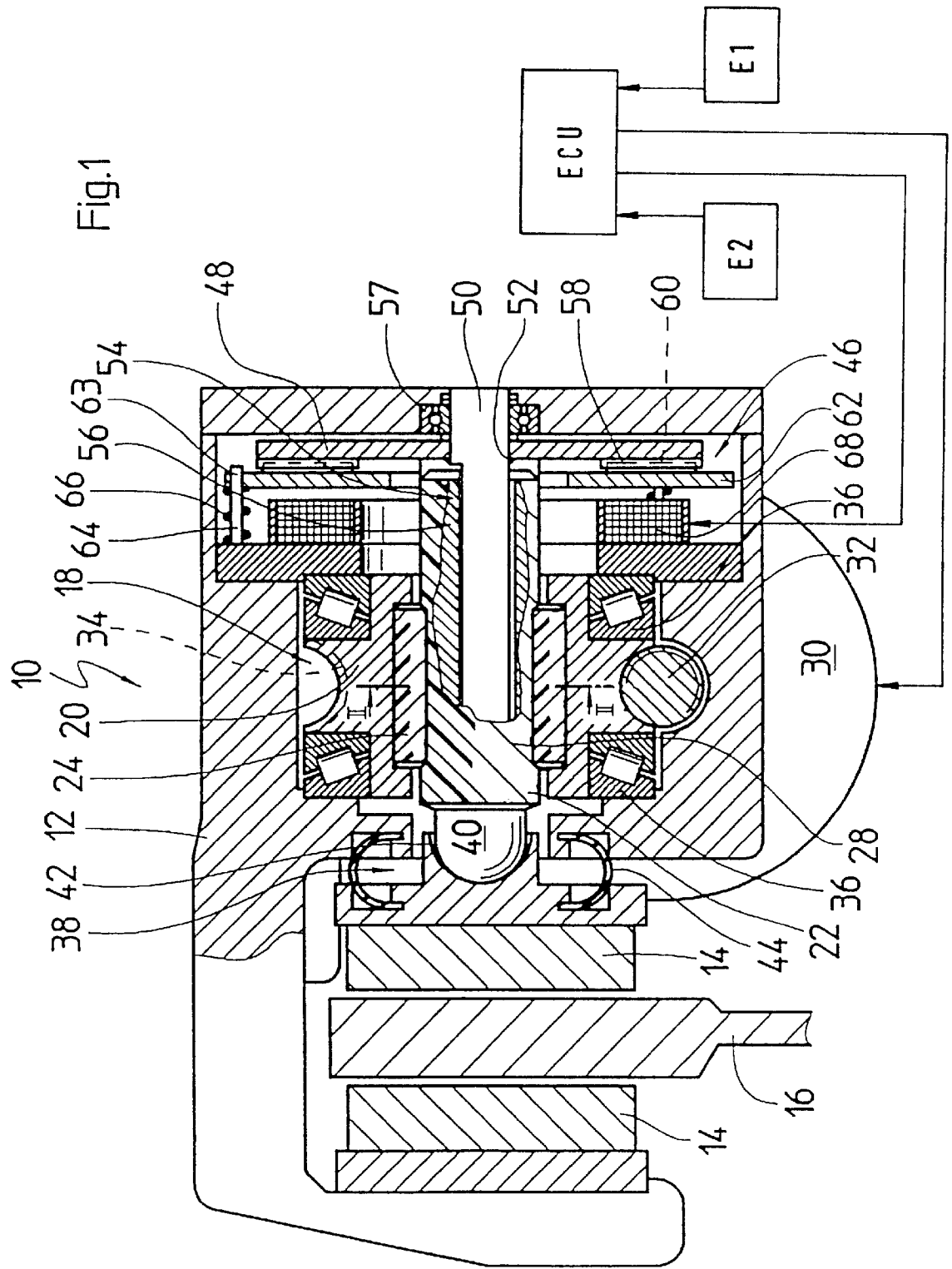
FIG. 1 shows an axial section through a wheel brake device according to the invention.

The electromechanical wheel brake device 10 according to the invention as shown in the drawing is embodied as a disc brake. The wheel brake device has a floating caliper 12 in which a pair of wheel brake linings 14 are affixed on both sides of a brake disc 16 that can be set into rotation between the brake linings. In order to press one of the two frictional brake linings 14 against the brake disc 16, the wheel brake device 10 according to the invention has a screw link actuator 18 built into the floating caliper 12. For the sake of very low friction and high efficiency, the screw link actuator 18 is embodied as a roller screw drive in the form of a planetary roller screw drive. The screw link actuator has a threaded spindle 22 disposed coaxially in a spindle nut 20 and eight threaded rollers 24 that are disposed in an intermediary space between the spindle nut 20 and the threaded spindle 22 (see FIG. 2). The threaded rollers 24 engage with a spindle thread 28 of the threaded spindle 22. Through a rotating drive of the spindle nut 20, the threaded rollers 24 are driven into a revolving motion around the threaded spindle 22 like the planet gears of a planetary gear. During their revolving motion, the threaded rollers 24 roll against the spindle thread 28 and during this revolving motion around the threaded spindle 22, the threaded rollers execute a rotating motion around their own axes. By way of the revolving threaded rollers 24, a rotary driving motion of the spindle nut 20 produces a translatory motion of the threaded spindle 22 in the axial direction.

In order to drive the spindle nut 20 to rotate, the wheel brake device 10 according to the invention has an electric motor 30 with a worm 32, which meshes with a rotating gearing 34 of the spindle nut 20. Instead of the worm gear 32, 34, a spiral bevel gear, for example, can also be provided (not shown). The electric motor 30 is embodied as one which can be electronically commutated.

The spindle nut 20 is supported with a pair of axial angular roller bearings 36 so that the spindle nut can rotate in the floating caliper 12 and is supported axially against the floating caliper 12 via the angular roller bearings 36.

One of the frictional brake linings 14 is disposed on an end face of the threaded spindle 22 oriented toward the brake disc 16. A pivot bearing 38 between the threaded spindle 22 and the frictional brake lining 14, which transmits compressive forces in the axial direction from the threaded spindle 22 onto the brake lining 14 and in the reverse direction, permits a rotation of the threaded spindle 22 in relation to the rotationally fixed frictional brake lining 14. The pivot bearing has a dome 40 that is of one piece with the threaded spindle 22 and rests in a larger diameter half ball socket 42 of the frictional brake lining 14. The dome 40 constitutes a bearing head of the pivot bearing 38 and the half ball socket 42 constitutes a bearing socket of this pivot bearing 38. This pivot bearing 38 is simple in design and can therefore be produced inexpensively. Since a relative movement between the threaded spindle 22 and the frictional brake lining 14 only takes place in the event of a malfunction, but not with the provided actuation and release of the wheel brake device 10 according to the invention, a slide bearing as the pivot bearing 38 is sufficient; a more expensive roller bearing can be omitted. The pivot bearing 38 with the dome 40 and the half ball socket 42 has the advantage that it can withstand high stresses in the axial direction and has a low friction in a rotating motion between the threaded spindle 22 and the frictional brake lining 14. A bearing head 40 and a bearing socket 42 that deviate from the ball shape can also be used, for example paraboloid or ellipsoid shapes.

A sealing collar 44 is inserted between the floating caliper 12 and the frictional brake lining 14 attached to the threaded spindle 22 and this sealing collar 44 encloses both the threaded spindle 22 in the vicinity of its dome 40 and the half ball socket 42 of the frictional brake lining 14 and protects the screw link actuator 18 and the floating caliper 12 from the penetration of moisture and dirt from the brake disc side. The sealing collar 44 is embodied as a circular ring, its annular cross section has the shape of a semicircular arc. Instead of the sealing collar 44 shown, for example a sealing collar that is shaped like a bellows can be used, which is not shown. In addition to its sealing function, the sealing collar 44 has the task of holding the frictional brake lining 14 in the axial direction in contact with the threaded spindle 22.

Figure 2:
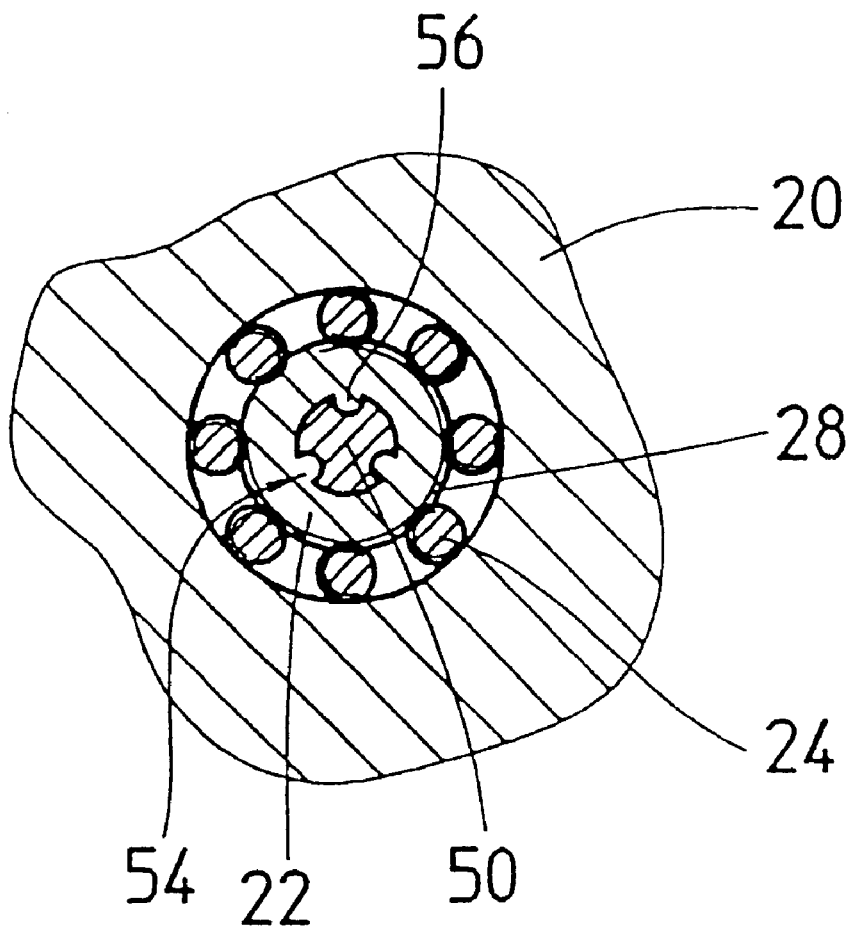
FIG. 2 shows a section along line II—II in FIG. 1.

The screw link actuator 18 of the wheel brake device 10 according to the invention is embodied as selflocking-free, i.e. by means of pressure on the threaded spindle 22 in the axial direction, this spindle can be set into rotation and in so doing, moves in translatory fashion in the axial direction, it "unscrews" from the spindle nut 20. In order to prevent rotation of the spindle nut 20, the wheel brake device 10 has a releasable rotation prevention device 46 on a side of the screw link actuator 18 remote from the brake disc 16: on a side of the screw link actuator 18 remote from the brake disc 16, a clutch disc 48 is provided, which is disposed in a radial plane relative to the threaded spindle 22. The clutch disc 48 is connected to the threaded spindle 22 in a rotationally secured fashion by means of a positively engaging connection: the clutch disc 48 is connected by means of a weld 52 to a profiled pin 50 disposed coaxially inside the threaded spindle 22, which is embodied as a hollow spindle for this purpose. The profiled pin 50 is embodied as essentially cylindrical; in the region in which the pin 50 is disposed inside the threaded spindle 22, it is provided with three longitudinal grooves 54 which are disposed equidistantly on its circumference (FIG. 2). The longitudinal grooves 54 have a semicircular groove bottom. The threaded spindle 22, which is embodied as a hollow shaft, has three springs 56 that are of one piece with the spindle 22, extend in the longitudinal direction, and engage in the longitudinal grooves 54 of the profiled pin 50 and by means of positive engagement, connect the threaded spindle 22 in a rotationally secured fashion to the profiled pin 50 and thereby to the clutch disc 48 and permit an axial movement of the threaded spindle 22 on the profiled pin 50. By means of a ball bearing 57, the profiled pin 50 is supported in rotary fashion in the floating caliper 12 on a side of the clutch disc 48 remote from the screw link actuator 18.

Instead of the profile shown, the profiled pin 50 can also have a different cross sectional shape such as a polygonal profile, a longitudinal gearing, or another cross sectional shape that differs from the circular shape and assures a positive engagement in the circumference direction, wherein the threaded spindle 22, which is embodied as a hollow shaft, has a complementary internal profile so that the threaded spindle 22 is prevented from rotating in relation to the profiled pin 50 by means of positive engagement and can move in the axial direction. It is also possible, for example, for there to be a wedge connection (not shown) with a wedge that is inserted into a longitudinal groove of the profiled pin 50 and engages in a longitudinal groove of the threaded spindle 22.

The clutch disc 48 has a gearing 58 on an end face oriented toward the screw link actuator 18 and uses this gearing to engage with a complementary gearing 60 of an armature disc 62. The armature disc 62 is connected to the floating caliper 12 in such a way that the armature disc is secured against relative rotation, but can move a short distance in the direction of the screw link actuator 18. To that end, the armature disc 62 is provided with three bores 63 close to its circumference, which are offset in relation to one another by 120°, with which the armature disc is movably placed on three stay bolts 64, which are firmly inserted into the floating caliper 12 axially parallel to the screw link actuator 18 and flush with the bores 63 of the armature disc 62. Helical compression springs are placed onto the stay bolts 64 as clutch engaging springs 66, which press the armature disc 62 against the clutch disc 48 and thereby keep the gearings 58, 60 of the clutch disc 48 and the armature disc 62 engaged with each other. The clutch disc 48 is connected in a rotationally secured fashion to the armature disc 62 by means of the gearings 58, 60, i.e. the profiled pin that is connected to the clutch disc 48 in a rotationally secured fashion and the threaded spindle 22 that is connected to the profiled pin 50 in a rotationally secured fashion are contained in the floating caliper 12 so that they cannot rotate in relation to each other. When the threaded spindle 20 is driven to rotate, the threaded spindle 22 that is secured against rotation in the floating caliper 12 only moves axially, it does not rotate.

In order to release the rotation prevention device 46, it has an annular electromagnet 68, which is depicted as a winding in FIG. 1. The electromagnet 68 is attached to the floating caliper 12 between the armature disc 62 and the screw link actuator 18. When supplied with current, the electromagnet 68 attracts the armature disc 62 counter to the force of the clutch engaging springs 66, by means of which the armature disc 62 moves in the axial direction far enough away from the clutch disc 48 that the gearings 58, 60 of the clutch disc 48 and the armature disc 62 disengage from each other. As a result, the clutch disc 48 and together with it, the profiled pin 50 and the threaded spindle 22, are no longer prevented from rotating. The rotation prevention device 46 that has the clutch disc 48 and the armature disc 62, with both of their gearings 58, 60, the stay rods 64, the clutch engaging springs 66, and the electromagnet 68, is embodied as a positively engaging, releasable clutch which is engaged when without current and therefore secures the threaded spindle 22 against rotating in the floating caliper 12 by means of the profiled rod 50 and which can be released or disengaged by supplying the electromagnet 68 with current, which results in the fact that the threaded spindle 22 is no longer prevented from rotating.

The wheel brake device 10 according to the invention functions as follows:

For the actuation, the electric motor 30 drives the spindle nut 20 to rotate in an actuating rotation direction so that the threaded spindle 22 is moved in a translatory fashion axially in the direction of the brake disc 16. As a result, the releasable rotation prevention device 46—in the form of the clutch 48, 58, 60, 62, 64, 66, 68 that is engaged when without current—prevents a rotation of the threaded spindle 22. The threaded spindle 22 presses the frictional brake lining 14 disposed on the threaded spindle against one side of the brake disc 16. A reaction force presses the second frictional brake lining 14 against the other side of the brake disc 16 in an intrinsically known manner by way of the floating caliper 12. The brake disc 16 is braked, wherein a braking force or braking moment is proportional to the driving moment exerted by the electric motor 30.

In order to release the wheel brake device 10 or in order to reduce the braking force, the electric motor 30 drives the spindle nut 20 in the opposite restoring direction, which results in the threaded spindle 22 being moved in a translatory fashion away from the brake disc 16. The frictional brake lining 14 disposed on threaded spindle is lifted up from the brake disc 16 by way of the sealing collar 44. The threaded spindle 22 is moved back until there is a gap, which remains the same independent of a wear on the frictional brake linings 14, produced between the frictional brake linings 14 and the brake disc 16 when the wheel brake device 10 is not actuated; the so-called "air play" of the wheel brake device 10 according to the invention remains constant.

In the event of a malfunction, i.e. in the event of a failure of the control electronics for the wheel brake device 10 according to the invention, in the event of a failure of its electric motor 30 or its power supply, the rotation prevention device 46 is released, i.e. the clutch 48, 58, 60, 62, 64, 66, 68 is disengaged due to the fact that the electromagnet 68 is supplied with current. The threaded spindle 22 can therefore rotate freely; the threaded spindle is pressed in the axial direction away from the brake disc 16 by the frictional brake lining 14 pressed against the brake disc 16, as a result of which this threaded spindle 22 is set into rotation—since the screw link actuator 18 is selflocking-free—and moves in translatory fashion away from the brake disc 16. The wheel brake device 10 is therefore released until the application force of the frictional brake linings 14 against the brake disc 16 is so low that the threaded spindle 22 no longer moves because of internal friction of the planetary roller screw drive 18. The frictional brake linings 14 rest against the brake disc 16 with a negligibly low residual force and an acceptable residual brake force of the wheel brake device 10 acts on the brake disc 16. This residual brake force is so slight that the brake disc 16 can rotate virtually freely and a vehicle equipped with the wheel brake device 10 can be driven without causing an overheating of the wheel brake device 10.

In the event of a failure of the power supply of the electric motor 30 or in the event of a failure of the electric motor itself, it is therefore possible to release the wheel brake device 10 because the electric motor 30 and the rotation prevention device 46 constituted by the electromagnetic clutch 48, 58, 60, 62, 64, 66, 68 are connected to energy supply circuits E1 and E2 that are independent of each other (FIG. 1). The two energy supply circuits E1 and E2 are connected to an electronic control unit ECU of the wheel brake device 10. This control unit supplies the electric motor 30 with power from the energy supply circuit E1 as a function of a braking request signal. If, based on the signals of sensors that are not shown, the control unit ECU determines that the actuated wheel brake device 10 cannot be released, then the control unit ECU supplies the electromagnet 68 of the rotation prevention device 46 with power from the energy supply circuit E2. The wheel brake device 10 is therefore reliably released if the energy supply circuit E2 is intact.

In the exemplary embodiment shown in FIG. 1, the electronic control unit ECU is associated with the wheel brake device 10. Since a motor vehicle is usually equipped with such wheel brake devices 10 in all of its wheels, the control unit 10 can also be used to control the remaining wheel brake devices of the vehicle. Instead of this, however, each wheel brake device 10 of the vehicle can also be equipped with a separate control unit ECU. In this instance, all of the control units ECU of the vehicle can be connected to a primary central control unit.

In a vehicle such as a passenger vehicle, with a number of wheel brake devices 10, these are associated with brake circuits that are distributed, for example, diagonally or by axle. In a distribution of this kind, the electric motors 30 and the rotation prevention devices 46 of the rest of the wheel brake devices 10 are also connected to the two energy supply circuits E1 and E2; for example in brake circuits that are distributed by axle, these energy supply circuits are connected in such a way that in the wheel brake devices 10 that are associated with a front axle, their electric motors 30 are connected to the energy supply circuit E1 and their rotation prevention devices 46 are connected to the energy supply circuit E2. Wheel brake devices 10 associated with the rear axle of the vehicle then have their electric motors 30 connected to the energy supply circuit E2 and have their rotation prevention devices 46 connected to the energy supply circuit E1. If there is a failure of the energy supply circuit E2, actuated wheel brake devices 10 on the rear axle of the vehicle can be released. The vehicle can still be braked by means of the wheel brake devices 10 of the front axle, which are supplied with power from the intact energy supply circuit E1.

The foregoing relates to a preferred exemplary embodiments of the invention, it being understood that other variants and embodiments thereof are possible within the spirit and scope of the invention, the latter being defined by the appended claims.

What is claimed is:

1. An electromechanical wheel brake device (10) for a motor vehicle, comprising an electric motor (30), a screw link actuator (18) that is embodied as selflocking-free, a spindle nut (20) that is driven in forward and reverse rotational directions by the electric motor (30), a rotatable threaded spindle (22), a releasable rotation prevention device (46) which is disposed in stationary fashion in the wheel brake device (10) and is embodied in a form of a switchable electromagnetic clutch connected to the threaded spindle (22), a frictional brake lining (14) which, by means of the screw link actuator (18) is electromotively pressed against and released from a brake body (16) connected to a vehicle wheel in a rotationally fixed manner, the threaded spindle (22) is both rotated and axially moved, so that the frictional brake lining (14) can be pressed against the brake body (16) and released from the brake body (16) by means of the threaded spindle (22) of the screw link actuator (18), and the rotation prevention device (46) keeps the threaded spindle (22) rotationally fixed during the electromotive application and release of the frictional brake lining (14) so that the threaded spindle can only move axially, but in the event that the frictional brake lining (14) cannot be electromotively released due to a malfunction, the rotation prevention device permits a rotation and axial movement of the threaded spindle (22).

2. The electromechanical wheel brake device according to claim 1, wherein the threaded spindle (22) is a hollow spindle which is slid onto a pin (50), that the hollow spindle is connected by means of a positive engagement (54, 56) so that the hollow spindle is secured against rotation and can move axially, wherein the pin (50) is connected to the rotation prevention device (46) in a rotationally fixed manner.

3. The electromechanical wheel brake device according to claim 2, wherein the pin (50) is a profiled pin and that the threaded spindle (22) has an internal profile (56) that is complementary to the profiled pin (50).

4. The electromechanical wheel brake device according to claim 1, which includes a pivot bearing (38), which is disposed between the frictional brake lining (14) and the threaded spindle (22) of the screw link actuator (18) that presses the frictional brake lining (14) against the brake body (16), which permits a rotational movement between the frictional brake lining (14) and the threaded spindle (22) of the screw link actuator (18) that presses the frictional brake lining (14) against the brake body (16), and which transmits a translatory motion of the threaded spindle (22) of the screw link actuator (18) that presses the frictional brake lining (14) against the brake body (16), onto the frictional brake lining (14) in the direction of the frictional brake lining (14).

5. The electromechanical wheel brake device according to claim 4, in which the pivot bearing (18) has a rounded bearing head (40) which rests in a bearing socket (44).

6. The electromechanical wheel brake device according to claim 1, which includes a sealing collar (44) disposed on a side of the screw link actuator (18) oriented toward the frictional brake lining (14), the sealing collar (44) protects the screw link actuator (18) against moisture and contamination and keeps the frictional brake lining (14) in contact with the threaded spindle (22) of the screw link actuator (18) that presses the frictional brake lining (14) against the brake body (16).

7. The electromechanical wheel brake device according to claim 1, in which the screw link actuator (18) is a planetary roller screw drive.

8. The electromechanical wheel brake device according to claim 1, in which the electric motor (30) is one which can be electronically commutated.

9. The electromechanical wheel brake device according to claim 1, which includes an energy supply circuit (E1) for the electric motor (30), and the electromagnetic clutch (46) is connected to an energy supply circuit (E2) that is independent of the energy supply circuit (E1) of the electric motor (30).

10. The electromechanical wheel brake device according to claim 1, which includes a sealing collar (44) disposed on a side of the screw link actuator (18) oriented toward the frictional brake lining (14), the sealing collar (44) protects the screw link actuator (18) against moisture and contamination and keeps the frictional brake lining (14) in contact with the threaded spindle (22) of the screw link actuator (18) that presses the frictional brake lining (14) against the brake body (16).

11. The electromechanical wheel brake device according to claim 1, which includes an energy supply circuit (E1) for the electric motor (30), and the electromagnetic clutch (46) is connected to an energy supply circuit (E2) that is independent of the energy supply circuit (E1) of the electric motor (30).

12. The electromechanical wheel brake device according to claim 8, which includes an energy supply circuit (E1) for the electric motor (30), and the electromagnetic clutch (46) is connected to an energy supply circuit (E2) that is independent of the energy supply circuit (E1) of the electric motor (30).

* * * * *